United States Patent
Liu et al.

(10) Patent No.: US 9,843,716 B2
(45) Date of Patent: Dec. 12, 2017

(54) METHOD AND APPARATUS FOR ADJUSTING PHOTOGRAPHY PARAMETERS

(71) Applicant: Xiaomi Inc., Beijing (CN)

(72) Inventors: Huayijun Liu, Beijing (CN); Mingyong Tang, Beijing (CN); Tao Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/957,076

(22) Filed: Dec. 2, 2015

(65) Prior Publication Data

US 2016/0261792 A1    Sep. 8, 2016

(30) Foreign Application Priority Data

Mar. 3, 2015  (CN) .......................... 2015 1 0093685
Sep. 1, 2015  (WO) ................ PCT/CN2015/088707

(51) Int. Cl.
| | | |
|---|---|---|
| *H04N 5/232* | (2006.01) | |
| *G03B 15/00* | (2006.01) | |
| *G03B 7/00* | (2014.01) | |
| *G06K 9/00* | (2006.01) | |

(Continued)

(52) U.S. Cl.
CPC ......... *H04N 5/23219* (2013.01); *G03B 7/003* (2013.01); *G03B 15/00* (2013.01); *G06K 9/00201* (2013.01); *H04N 5/238* (2013.01); *H04N 5/2353* (2013.01)

(58) Field of Classification Search
CPC .. H04N 5/23219; H04N 5/2353; H04N 5/235; H04N 5/238; G03B 7/003; G03B 15/00; G06K 9/00201
See application file for complete search history.

(56) References Cited

U.S. PATENT DOCUMENTS

| | | | | |
|---|---|---|---|---|
| 5,764,786 | A | * | 6/1998 | Kuwashima ........... H04N 5/232 348/E5.042 |
| 2004/0207743 | A1 | * | 10/2004 | Nozaki ............... H04N 5/23212 348/333.12 |

(Continued)

FOREIGN PATENT DOCUMENTS

| | | |
|---|---|---|
| CN | 101867717 A | 10/2010 |
| CN | 102404495 A | 4/2012 |

(Continued)

OTHER PUBLICATIONS

Machine Translation of CN104333709A.*

(Continued)

*Primary Examiner* — Jason Flohre

(57) ABSTRACT

A method and an apparatus for adjusting photography parameters are provided. The method includes: determining a pupil size of a person; and adjusting one or more photography parameters according to the pupil size. The pupil size of the person is determined, and then one or more photography parameters such as the aperture size may be adjusted automatically according to the pupil size of the person. Since a current pupil size is subject to a light intensity in current surroundings, the photography parameters of a photographic device may be adjusted automatically and efficiently based on the pupil size.

15 Claims, 9 Drawing Sheets

(51) Int. Cl.
*H04N 5/235* (2006.01)
*H04N 5/238* (2006.01)

(56) References Cited

U.S. PATENT DOCUMENTS

| | | | | |
|---|---|---|---|---|
| 2005/0200744 | A1* | 9/2005 | Kobayashi | H04N 5/23245 348/362 |
| 2006/0125952 | A1* | 6/2006 | Kubota | H04N 5/2352 348/362 |
| 2008/0204565 | A1* | 8/2008 | Yumiki | H04N 5/23219 348/208.99 |
| 2010/0321482 | A1* | 12/2010 | Cleveland | H04N 5/23203 348/78 |
| 2012/0147252 | A1* | 6/2012 | Kunishige | H04N 5/23212 348/345 |
| 2012/0242852 | A1 | 9/2012 | Hayward et al. | |
| 2015/0199559 | A1 | 7/2015 | Sztuk | |

FOREIGN PATENT DOCUMENTS

| | | | |
|---|---|---|---|
| CN | 103209287 | A | 7/2013 |
| CN | 103325358 | A | 9/2013 |
| CN | 103780957 | A | 5/2014 |
| CN | 104333709 | A * | 2/2015 |
| CN | 104333709 | A | 2/2015 |
| CN | 104811609 | A | 7/2015 |
| CN | 104954661 | A | 9/2015 |
| JP | H07181562 | A | 7/1995 |
| JP | 2004-120576 | A | 4/2004 |
| JP | 2004-343317 | A | 12/2004 |
| JP | 2004343315 | A | 12/2004 |
| JP | 2004343317 | A * | 12/2004 |
| JP | 2005-087300 | A | 4/2005 |
| JP | 2006157428 | A | 6/2006 |
| JP | 2007331545 | A | 12/2007 |
| JP | 2011-039284 | A | 2/2011 |
| JP | 2012104879 | A | 5/2012 |
| JP | 2012231200 | A | 11/2012 |
| WO | 2013/049890 | A1 | 4/2013 |
| WO | 2013/067230 | A1 | 5/2013 |
| WO | 2015150622 | A1 | 3/2015 |

OTHER PUBLICATIONS

JP-2004-343317-A Translation—Machine Translation of corresponding foreign document.*
International Search Report dated Nov. 26, 2015 for International Application No. PCT/CN2015/088707, 4 pages.
Office Action issued in corresponding Korean Patent Application No. 10-2015-7031217 with English translation, dated Feb. 20, 2017, 9 pages.
Extended European Search Report issued in corresponding European Patent Application No. 16 15 0913, dated Mar. 14, 2015, 9 pages.
International Search Report issued in corresponding PCT Application No. PCT/CN2015/088707, dated Nov. 26, 2015, 3 pages.
Office action issue in corresponding Korean Patent Application 10-2015-7031217, dated Aug. 12, 2016, 6 pages.
Zakaznov N.P. et al, Theory of Optical Systems, Moscow, Mechanical Engineering, 1992, §58 "Eye structure", p. 171, second paragraph (total 3 pages).
Notification of Reasons for Refusal (including English translation) issued in corresponding Japanese Patent Application No. 2017-503047, dated Jul. 5, 2017, 10 pages.
Office Action issued in corresponding Russian Patent Application No. 2015147203/28(072638), dated Jul. 12, 2017, 7 pages.

* cited by examiner

METHOD AND APPARATUS FOR ADJUSTING PHOTOGRAPHY PARAMETERS

CROSS-REFERENCE TO RELATED APPLICATIONS

This application is a Continuation-in-part application of International Application PCT/CN2015/088707, with an international filing date of Sep. 1, 2015, which is based on and claims priority to Chinese Patent Application No. 201510093685.3, filed on Mar. 3, 2015, the entire contents of which are incorporated herein by reference.

TECHNICAL FIELD

The present disclosure generally relates to technical field of photographic device, and more particularly, to a method and an apparatus for adjusting photography parameters.

BACKGROUND

Conventional photographic devices are widely used to take photos whenever and wherever possible, so as to record every little thing in everyday life. Such photographic devices may include digital cameras, mobile phones, and wearable photographic devices. However, the quality of a photo, i.e. photographic effect is affected to a great extent by adjustment of some photography parameters, for example, parameters related to shutter speed, aperture size, and the like.

In related arts, photography parameters of a photographic device are set or adjusted manually by a person according to factors associated with subjects, current surrounding environment, and so on, in combination with his/her own experience.

SUMMARY

Embodiments of the present disclosure provide a method and an apparatus for adjusting photography parameters, so as to achieve a quick and efficiency adjustment for the photography parameters of a photographic device.

According to a first aspect of the present disclosure, there is provided a method for adjusting photography parameters. The method includes: determining a pupil size of a person; and adjusting one or more photography parameters according to the pupil size.

According to a second aspect of the present disclosure, there is provided an apparatus for adjusting photography parameters, including: a determination module configured to determine a pupil size of a person; and an adjustment module configured to adjust the photography parameters according to the pupil size.

According to a third aspect of the present disclosure, there is provided an apparatus for adjusting photography parameters, including: a processor; and a memory for storing instructions executable by the processor, wherein the processor is configured to perform: determining a pupil size of a person; and adjusting one or more photography parameters according to the pupil size.

According to a fourth aspect of the present disclosure, there is provided a non-transitory computer-readable storage medium having stored therein instructions that, when executed by a processor of a photographic device, causes the photographic device to perform a method for adjusting photography parameters. The method include: determining a pupil size of a person; and adjusting one or more photography parameters according to the pupil size.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Figure 1:
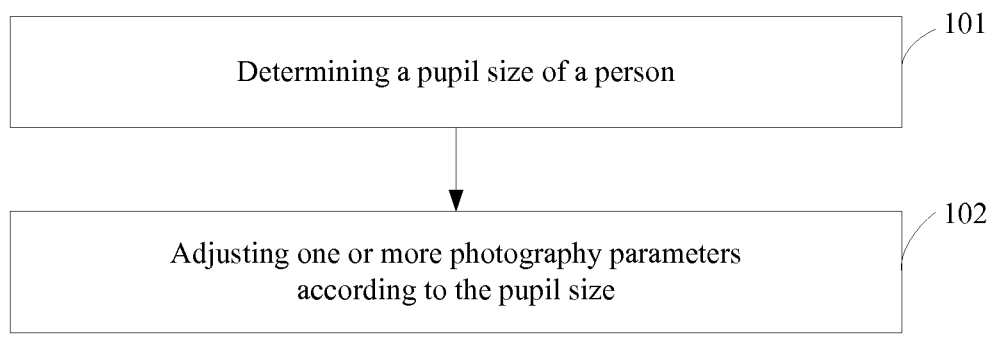
FIG. 1 is a flow chart illustrating a method for adjusting photography parameters according to an exemplary embodiment.

Specific embodiments of the present disclosure are shown by the above drawings, and more detailed description will be made hereinafter. These drawings and text description are not for limiting the scope of the present disclosure concept in any way, but for illustrating the concept of the present disclosure for those skilled in the art by referring to specific embodiments

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

Following advantageous effects may be achieved in technical solution provided by the embodiments of the present disclosure.

The pupil size of the person is determined, and then one or more photography parameters such as the aperture size may be adjusted automatically according to the pupil size of the person. Since a current pupil size is subject to a light intensity in current surroundings, the photography parameters of a photographic device may be adjusted automatically and efficiently, based on the pupil size, as being adapt to the current surroundings. Thus, quality of taken images may be improved by simple operation without necessity of professional skills for a person.

It is to be understood that both the foregoing general description and the following detailed description are exemplary and explanatory only and are not restrictive of the invention, as claimed.

First, several technical terms involved in embodiments of the present disclosure will be explained as follows.

Aperture: an element generally located inside a lens and used for controlling an amount of light entering into a frame via the lens. An aperture size may be indicated by a value of f, where the greater a numerical value of f is, the smaller the aperture size is, and vice versa. Moreover, the smaller the numerical value of f is, the greater the amount of entered light per unit time is due to a greater aperture size.

Shutter: a mechanic or electronic element used for controlling duration of an exposure by blocking light in front of the lens.

ISO value: indicative of sensing capability or sensitivity to light of sensors in a photographic device.

FIG. 1 is a flow chart illustrating a method for adjusting photography parameters according to an exemplary embodiment. As shown in FIG. 1, the method for adjusting photography parameters according to the present embodiment may be implemented in a photographic device which refers to a device capable of photographing. For example, the photographic device may include a camera, a mobile phone, a tablet computer, or a wearable device with photographing function such as a smart bracelet, a smart glasses and the like. The method for adjusting photography parameters may include following steps.

In step S101, determining a pupil size of a person in a photo. The person may be the photographer when the person is taking a selfie. The photographic device may determine a pupil region using pattern recognition or other technologies. The pupil region may include a relative ratio or a number at least indicative of the number of pixels in the pupil region. The photographic device may determine the pupil size by analyzing data from one or more sensors in the photographic device. Alternatively or additionally, the photographic device may determine the pupil size by analyzing data from an external sensor not in the photographic device. The external sensor may include a sensor in a smart glass, a selfie stick, or other electronic devices. The photographic device may also determine a distance between the person and the camera using the external sensor. The photographic device may automatically initiate the pupil determination step when the distance is shorter or equal to a preset threshold.

In step S102, adjusting one or more photography parameters according to the pupil size. The photographic device may automatically adjust one or more photography parameters according to the pupil size. For example, when the person selects a selfie mode, the photographic device may take a plurality of photos in a preset time period. The photographic device may adjust the photography parameters according to the pupil size in one or more photos taken earlier in the preset time period.

In an embodiment of the present disclosure, the pupil size of the person may be determined in a manner as follows.

The photographic device may photograph to obtain an image of ocular region for the person in a configuration of default parameters, and further may segment the image through image recognition technology to obtain an image of pupillary region, that is, a pupil image. The pupil size of the person needs to be determined after the pupil image thereof is obtained, and may be determined by counting a number of pixels occupied by the pupil. Alternatively or additionally, the pupil size may also be determined using a ratio between the absolute pupil size and a size of a second body part. For example, the ratio may be obtained by dividing the number of pixels in the pupil region by the number of pixels in the eye region.

Related technologies widely used in the art may be adopted as the image recognition technology mentioned above, and will not be described in details herein.

It should be noted that, the embodiment of determining the pupil size of the person is described above only as an example. In practice, the determination may also be achieved by some manners such as iris recognition technology and other biological means, but not limited thereto.

The pupil size of the person may be indicative of light intensity in current photography surroundings. Thus, in the embodiments of the present disclosure, the photography parameters of the photographic device may be adjusted automatically based on the pupil size, which is directly indicative of the person's response to the light intensity in the current photography surroundings, so as to achieve a desirable brightness of a resulted photo.

As to reasons for using the pupil size as a basis of adjustment, it is because that a person would spontaneously keep eyes open widely when ambient light is relatively weak, and would keep eyes squint when the ambient light is relatively strong so as not to be dazzled. In other words, the pupil size can be indicative of the light intensity of current surroundings.

The one or more photography parameters of the photographic device may include but not limited to an aperture size, a shutter speed and an ISO (International Organization for Standardization) value. Before a detailed description for meanings of those three parameters having major influence on exposure process and for correlation therebetween, it should be noted that, generally in the adjustment of photography parameters, the aperture size may be adjusted in the first place, while the other two parameters may be further adjusted as required or may be adapted automatically according to the aperture size determined by the adjustment. Alternatively, another parameter, for example, the shutter speed may also be adjusted before adjustment of the aperture size and the ISO value. However, hereinbelow will be described an example in which the aperture size is adjusted before adjustment of the shutter speed and the ISO value.

The meanings of those three photography parameters mentioned above and the correlation therebetween will be described firstly as follows.

In order to take photos or record videos, a normal exposure is one of essential requirements, which means that the amount of light entering into the photographic device is controlled appropriately without overexposure or underexposure. Furthermore, three essential parameters, i.e., the aperture size, the shutter speed and the ISO value, are mainly involved in how to control the amount of entered light. Now description will be given on how to control the amount of entered light through those three parameters.

Large aperture size is preferably suitable for use in weak light, which enables more light to enter without changing the shutter speed, so as to obtain a photo with normal exposure. Moreover, the aperture size has a visual effect on DOF (depth of filed). Simply speaking, the DOF means a blurring degree of the background. The greater the aperture size is, the more deeply the background may be blurred, which enables the photography subject to be highlighted. Otherwise, the smaller the aperture size is, the less deeply the background may be blurred, which enables both foreground and the background to be clear.

The shutter speed or exposure time is the length of time when the film or digital sensor inside a camera is exposed to light, also when the shutter is open when taking a photograph. The shutter speed may also refer to the duration from open to close of a shutter. The smaller a shutter speed value is, the shorter the duration is, and thus the less the amount of entered light is. The greater the shutter speed value is, the more the amount of entered light is. Moreover, a large shutter speed is preferably suitable for photographing a motion object, while a small shutter speed is preferably suitable for photographing a motionless object.

A small ISO value (e.g. ISO 100) may result in a photo with smooth quality and few noises, while a large ISO value (e.g. ISO 6400 and ISO 12800) may result in a photo with poor quality and many noises.

In short, the correlation between three parameters may be described as follows.

While keeping the shutter speed and the ISO value constant, the larger the aperture size is, the greater the amount of entered light is, the brighter the picture is, and the more obvious the DOF is. Otherwise, the smaller the aperture size is, the dimmer the picture is, and the less obvious the DOF is.

While keeping the aperture size and the ISO value constant, the faster the shutter speed is, the dimmer the picture is, and the weaker the dynamic display and the blurring degree are. Otherwise, the slower the shutter speed is, the brighter the picture is, and the better the effect of dynamic display is.

While keeping the shutter speed and the aperture size constant, the larger the ISO value is, the brighter the picture is, and the more the noises there are. Otherwise, the smaller the ISO value is, the dimmer the picture is, and the less the noises there are.

Based on the description of above three essential photography parameters and the correlation therebetween, a determination of the aperture size through adjustment will be provided according to embodiments of the present disclosure.

In a process of adjusting the aperture size according to the pupil size, there may be involved following cases, detailed implementation process of each case corresponding to the first to fourth embodiment subsequently described, respectively.

A first case: if the pupil size of the person is at or near a maximum value, the aperture size may be adjusted to a relatively large value or even a maximum aperture size.

A second case: if the pupil size of the person is at or near a minimum value, the aperture size may be adjusted to a relatively small value or even a minimum aperture size.

A third case: if the pupil size of the person is varied for a certain short time in an upward trend of becoming greater, the aperture size may be increased gradually. It should be noted that, unless the pupil size of the person reaches the maximum pupil size, the resulted aperture size in gradual increase should be smaller than the aperture size corresponding to the maximum pupil size.

A fourth case: if the pupil size of the person is varied for a certain short time in a downward trend of becoming smaller, the aperture size may be decreased gradually. It should be noted that, unless the pupil size of the person reaches the minimum pupil size, the resulted aperture size in gradual decrease should be greater than the aperture size corresponding to the minimum pupil size.

Figure 2A:
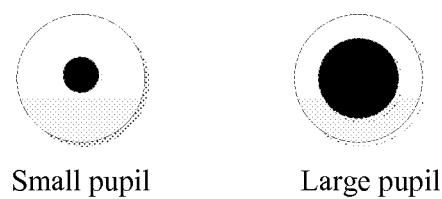
FIG. 2A is a schematic diagram illustrating a pupil size in the embodiment of FIG. 1.

FIG. 2A illustrates a schematic diagram of the pupil size.

In the embodiments of the present disclosure, the pupil size of the person is determined, and then one or more photography parameters such as the aperture size may be adjusted automatically according to the pupil size of the person. Since a current pupil size is subject to a light intensity in current surroundings, the photography parameters of a photographic device may be adjusted automatically and efficiently, based on the pupil size, as being adapt to the current surroundings. Thus, the parameters may be adjusted appropriately and conveniently by simple operation without necessity of professional skills for a person.

The step 102 described above of "adjusting one or more photography parameters according to the pupil size" may be achieved in a following manner:

adjusting the aperture size according to a mapping relation preset between pupil sizes and aperture sizes.

In other words, as an embodiment of the present disclosure, based on the example in which the aperture size is preferably adjusted, the mapping relation between pupil sizes and aperture sizes may be preset according to experimental statistics obtained in advance. The experimental statistics may include historical data from one or more users using the same type of photographic device. For example, the historical data may include statistics based on analyzing the photography parameters of the favorite photos compared to those deleted photos. Alternatively or additionally, while keeping the aperture size unadjusted, for example, if the shutter speed is preferably adjusted, a mapping relation between pupil sizes and shutter speeds may be obtained in advance, so as to adjust the shutter speed according to the mapping relation.

Figure 2B:
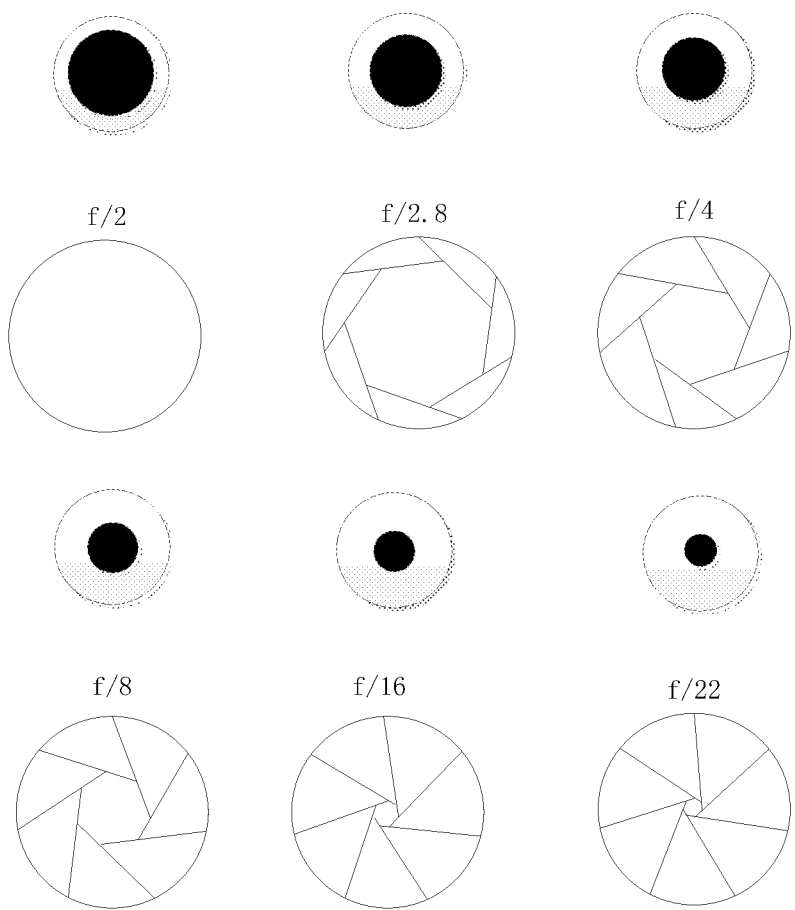
FIG. 2B is a schematic diagram illustrating a mapping relation between pupil sizes and aperture sizes.

FIG. 2B illustrates the mapping relation between pupil sizes and the aperture sizes. As shown in FIG. 2B, a maximum aperture size is illustrated at upper left, while a minimum aperture size is illustrated at lower right. Moreover, a larger aperture size corresponds to a larger pupil size, while a smaller aperture size corresponds to a smaller pupil size. Accordingly, decreased aperture sizes in turn illustrated in FIG. 2B correspond to decreased pupil sizes in turn, respectively.

Figure 3:
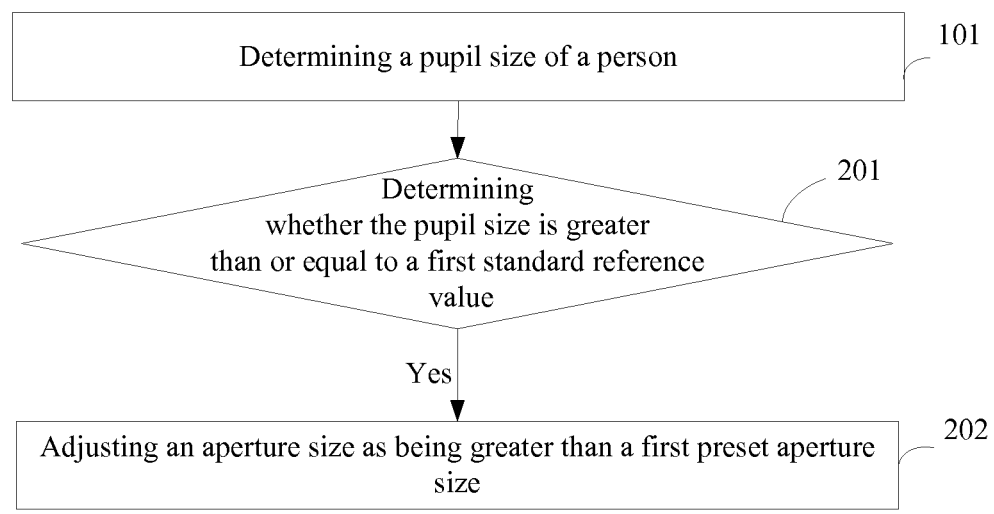
FIG. 3 is a flow chart illustrating a method for adjusting photography parameters according to an exemplary embodiment.

With respect to the above first case, an implementation process thereof may be described in detail hereinafter according to an embodiment, as shown in FIG. 3.

FIG. 3 is a flow chart illustrating a method for adjusting photography parameters according to an exemplary embodiment. As shown in FIG. 3, an implementation process for above step 102 of "adjusting the aperture size according to a mapping relation preset between pupil sizes and aperture sizes" may include steps as follows.

In step 201, determining whether the pupil size is greater than or equal to a first standard reference value and performing step 202 if it is.

In step 202, adjusting the aperture size as being greater than a first preset aperture size.

There generally may be a certain standard value for reference of the pupil size of human being. In practice, the first standard reference value mentioned above may refer to a maximum pupil size, while the second standard reference value mentioned below may refer to a minimum pupil size. Alternatively, as required, the first standard reference value may be set as a relatively large value smaller than the maximum pupil size, and the second standard reference value may also be set as a relatively small value greater than the minimum pupil size. Wherein the first standard reference value is greater than the second standard reference value.

As far as the first or second standard reference value as concerned, it may be a unique specific numerical value or a relatively small valuing range. The present embodiment is applicable regardless of whether the first or second standard reference value is valued uniquely or in the range.

In the determination process of above step 201, if it is neither greater than nor equal to the first standard reference value, it may be further determined whether it is smaller than or equal to the second standard reference value, and a determination of variation trend may be performed if neither of requirements for the first and second standard reference value is met. However, the present embodiment is merely described for determination of whether the pupil size is greater than or equal to the first standard reference value, while other determinations will be described in subsequent embodiments, respectively.

If it is determined the pupil size of the person is greater than or equal to the first standard reference value, then the current surroundings is in weak light, that is, the ambient light is weak. Accordingly, the photographic device may adjust the aperture size to set a relatively large aperture. Since the aperture size shows an opposite trend of an aperture value, that is, a larger aperture means a smaller aperture value, while a smaller aperture means a larger aperture value, thus a relatively small aperture value should be set.

It should be noted that, while adjusting the aperture size as being greater than the first preset aperture size if the pupil size is greater than or equal to the first standard reference value, the first preset aperture size may be a maximum aperture size of the photographic device, or an aperture size configured slightly smaller than the maximum aperture size, or may be set according to the mapping relation between aperture sizes and pupil sizes.

Furthermore, after adjusting the aperture size of the photographic device as a sufficiently large aperture size, the shutter speed and the ISO value may be adjusted adaptively based on meanings of the aperture size, the shutter speed and the ISO value as well as the correlation therebetween described above.

For example, after adjusting the aperture size, the photographic device may adjust the shutter speed further. Since it is determined by the pupil size that the ambient light in current surroundings is weak, the shutter speed value may be increased properly to a shutter speed value higher than a current shutter speed value by one or more levels in several levels of shutter speed values typically configured. After completion of adjustments for the aperture size and the shutter speed, the ISO value may be adapted automatically as a proper value by the photographic device according to the aperture size and the shutter speed resulted by the adjustments.

In the embodiments, if the pupil size of the person is determined as relatively large, the aperture size of the photographic device may be adjusted as a sufficiently large aperture size according to the relatively large pupil size. The shutter speed and the ISO value may be further adjusted adaptively. Thus, the photography parameters of the photographic device may be adjusted automatically, conveniently and efficiently, so as to be adapt to current photography surroundings and to take a photo with desirable quality.

Figure 4:
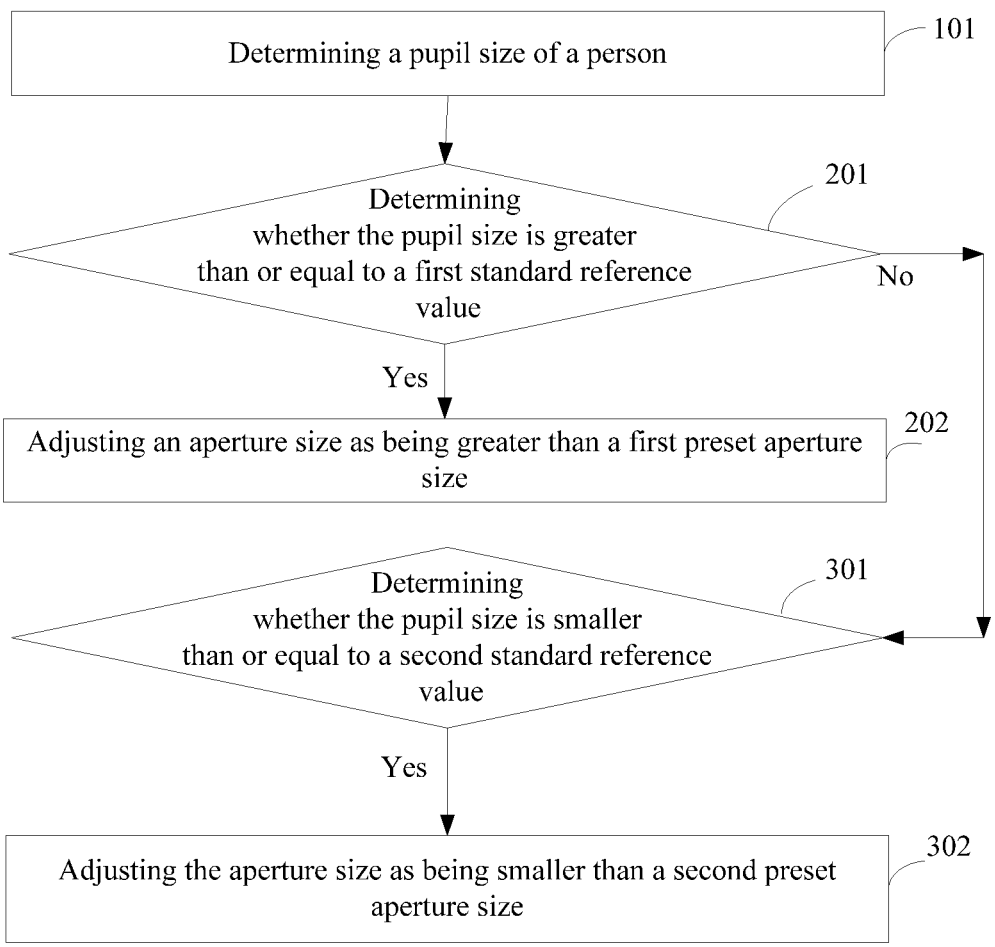
FIG. 4 is a flow chart illustrating a method for adjusting photography parameters according to an exemplary embodiment.

FIG. 4 is a flow chart illustrating a method for adjusting photography parameters according to an exemplary embodiment. As shown in FIG. 4, an implementation process for above step 102 of "adjusting the aperture size according to a mapping relation preset between pupil sizes and aperture sizes" may include steps as follows.

In step 301, determining whether the pupil size is smaller than or equal to a second standard reference value and performing step 302 if it is determined that the pupil size is smaller than or equal to a second standard reference value.

In step 302, adjusting the aperture size as being smaller than a second preset aperture size.

Similarly, the present embodiment is applicable regardless of whether the second standard reference value is valued uniquely or in the range. Moreover, the second preset aperture size is much smaller than the first preset aperture size.

If it is determined the pupil size of the person is smaller than or equal to the second standard reference value, then the current surroundings is in strong light, that is, the ambient light is strong, and thus a relatively small aperture is required, that is, the aperture size should be adjusted as a relatively small aperture size. Since the aperture size shows an opposite trend of an aperture value, that is, a larger aperture means a smaller aperture value, while a smaller aperture means a larger aperture value, thus a relatively large aperture value should be set.

It should be noted that, while adjusting the aperture size as being smaller than the second preset aperture size if the pupil size is smaller than or equal to the second standard reference value, the second preset aperture size may be a minimum aperture size of the photographic device, or an aperture size configured slightly larger than the minimum aperture size, or may be set according to the mapping relation between aperture sizes and pupil sizes.

Furthermore, after adjusting the aperture size of the photographic device as a sufficiently small aperture size, the shutter speed and the ISO value may be adjusted adaptively based on meanings of the aperture size, the shutter speed and the ISO value as well as the correlation therebetween described above.

For example, after adjusting the aperture size, the photographic device may adjust the shutter speed preferably. Since it is determined by the pupil size that the ambient light in current surroundings is strong, the shutter speed value may be decreased properly to a shutter speed value lower than a current shutter speed value by one or more levels in several levels of shutter speed values typically configured. After completion of adjustments for the aperture size and the shutter speed, the ISO value may be adapted automatically as a proper value by the photographic device according to the aperture size and the shutter speed resulted by the adjustments.

In the embodiments, if the pupil size of the person is determined as relatively small, the aperture size of the photographic device may be adjusted as a sufficiently small aperture size according to the relatively small pupil size. The shutter speed and the ISO value may be further adjusted adaptively. Thus, the photography parameters of the photographic device may be adjusted automatically, conveniently and efficiently, so as to be adapt to current photography surroundings and to take a photo with desirable quality.

It should be noted that, the embodiments illustrated in FIGS. 3 and 4 may be integrated together. In other words, the determination steps 201 and 301 may be expressed as: determining whether the pupil size meets requirements of standard reference values, performing step 202 if it is greater than or equal to the first standard reference value, and performing step 302 if it is smaller than or equal to the second standard reference value. Alternatively, as shown in FIG. 4, steps 201 and 301 may be performed separately in an order not limited to that shown in FIG. 4. If it is determined that neither of the requirements for the first and second standard reference value is met, a determination related to variation trend of the pupil size may be performed, referring to following embodiments shown in FIGS. 5 and 6.

Figure 5:
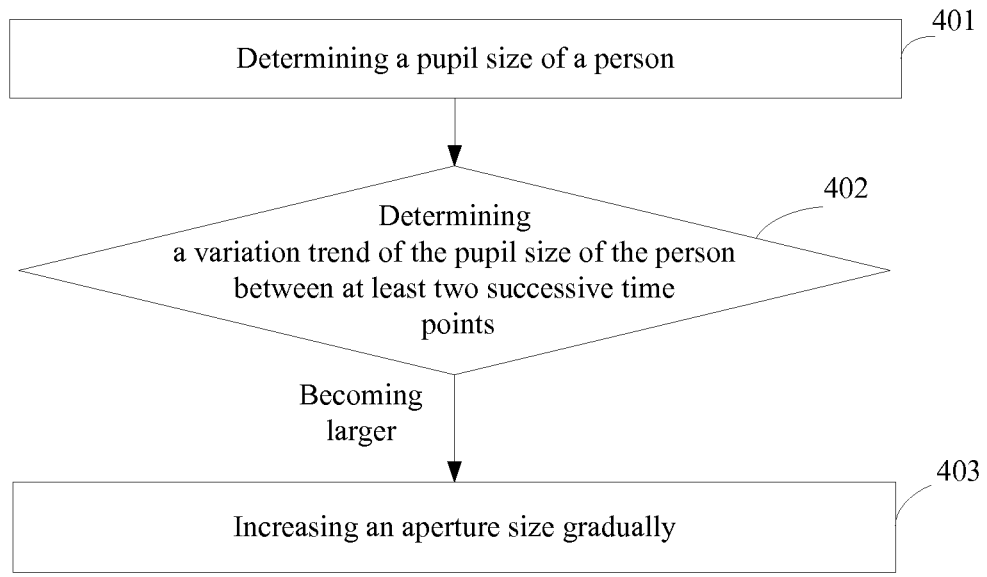
FIG. 5 is a flow chart illustrating a method for adjusting photography parameters according to an exemplary embodiment.

With respect to the above third case, an implementation process thereof may be described in detail hereinafter according to an embodiment, as shown in FIG. 5.

FIG. 5 is a flow chart illustrating a method for adjusting photography parameters according to an exemplary embodiment. As shown in FIG. 5, the method provided in the present embodiment may include following steps.

In step 401, determining the pupil size of the person.

In step 402, determining a variation trend of the pupil size of the person between at least two successive time points, and performing step 403 if the variation trend is upward.

In step 403, increasing the aperture size gradually.

It should be noted that, as far as the embodiments shown in FIGS. 3 and 4 are concerned, in order to determine whether the pupil size of the person is greater than or equal to the first standard reference value, or whether the pupil size of the person is smaller than or equal to the second standard reference value, only one pupil image is needed. Thus, the determination of pupil size in the embodiments of FIGS. 3 and 4 is not limited to any specific time, and even once is applicable. In other words, in order to determine the pupil size based on a pupil image(s), the number of the image(s) is not limited specifically, and there may be one or more images.

However, if it is determined that neither of requirements for the first and second standard reference values is met, a determination for the variation trend of the pupil size needs to be performed. At this time, pupil sizes of the person require to be determined for at least two successive time points, so as to determine the variation trend of the pupil size.

For example, in above embodiments of determining the pupil size by obtaining a pupil image, if it is determined, with only one pupil image, that neither of requirements for the first and second standard reference values is met, at least one another pupil image needs to be obtained. Otherwise, there is no such need if the photographic device may adjust have obtained at least two pupil images.

Furthermore, the pupil size in each pupil image is determined in time order of the at least two images, and the variation trend of the pupil size may be determined based on respective pupil size determined previously.

If the variation trend of the pupil size is upward where it becomes larger, it is indicated that the ambient light in current surroundings become weaker. Accordingly, the amount of entered light should be increased gradually by increasing the aperture size gradually.

However, it should be noted that, since the adjustment of the photography parameters is a gradual process and the pupil images are obtained by photographing for many times, pupil size in each pupil image photographed, except for the first one, may change more or less when compared to its former pupil image. In other words, as far as the present embodiment is concerned, the pupil size becomes larger gradually. Accordingly, the photographic device may adjust the aperture size gradually so as to be adaptive with the pupil size, that is, the aperture size should be adjusted gradually according to the mapping relation preset between pupil sizes and aperture sizes.

Furthermore, pupil sizes in last several pupil images in time order may be substantially equal to each other, which may indicate that the ambient light in current surroundings is relatively stable, and thus the aperture size may be determined finally according to the pupil size at this time.

It should be understood that, if the pupil size determined finally is smaller than the first standard reference value, the aperture size may be determined finally as being smaller than the first preset aperture size.

Furthermore, after gradually adjusting the aperture size of the photographic device as a proper aperture size, the shutter speed and the ISO value may be adjusted adaptively based on meanings of the aperture size, the shutter speed and the ISO value as well as the correlation therebetween described above.

For example, after the gradual increase of the aperture size, the photographic device may further adjust the shutter speed. Since it is determined by the pupil size that the ambient light in current surroundings becomes weaker, the shutter speed may be decreased accordingly. Each time after completion of adjustments for the aperture size and the shutter speed, the ISO value may be adapted automatically as a proper value by the photographic device according to the aperture size and the shutter speed resulted by the adjustments.

In the present embodiment, the aperture size of the photographic device may be adjusted gradually according to the variation trend of the pupil size, which is indicative of the person's response to strength of ambient light in current surroundings. The shutter speed and the ISO value may be further adjusted adaptively. Thus, the photography parameters of the photographic device may be adjusted automatically, conveniently and efficiently, so as to be adapt to current photography surroundings and to take a photo with desirable quality.

Figure 6:
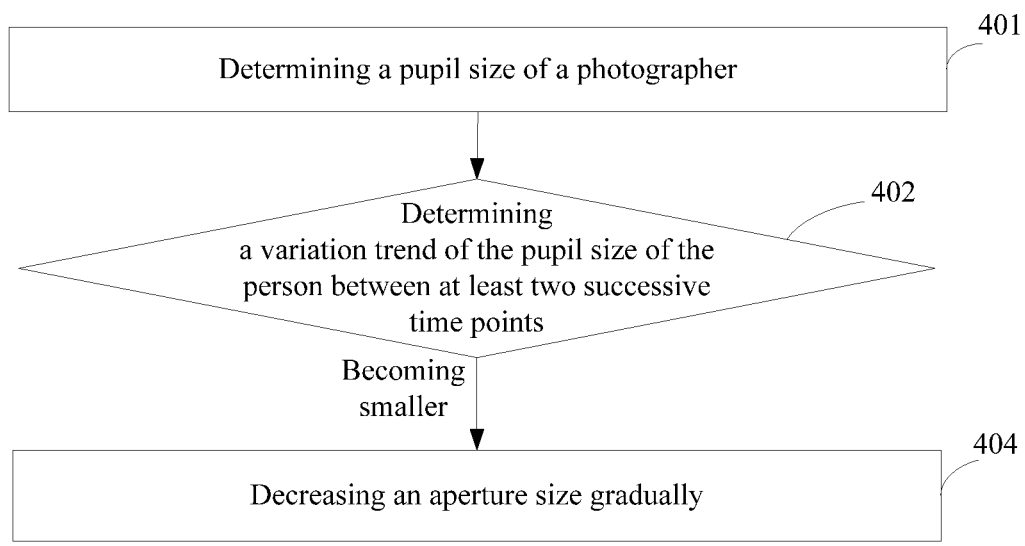
FIG. 6 is a flow chart illustrating a method for adjusting photography parameters according to an exemplary embodiment.

With respect to the above fourth case, an implementation process thereof may be described in detail hereinafter according to an embodiment, as shown in FIG. 6.

FIG. 6 is a flow chart illustrating a method for adjusting photography parameters according to an exemplary embodiment. As shown in FIG. 6, in the method provided by the present embodiment based on that shown in FIG. 5, upon determination of the variation trend of the pupil size in above step 402, following step 404 in the present embodiment is performed if the variation trend is downward.

In step 404, decreasing the aperture size gradually.

Based on the embodiment shown in FIG. 5, an example is also given where the variation trend of the pupil size is determined according to pupil image(s). The pupil size in each pupil image is determined in time order of the at least two images, and the variation trend of the pupil size may be determined based on respective pupil size determined previously. After that, if the variation trend of the pupil size is downward where it becomes smaller, it is indicated that the ambient light in current surroundings become stronger. Accordingly, the amount of entered light should be decreased gradually by decreasing the aperture size gradually. Herein, a process of gradual decrease is as similar to that of gradual increase described above, and will not be repeated.

It should be understood that, if the pupil size determined finally is greater than the second standard reference value, the aperture size may be determined finally as being greater than the second preset aperture size.

Furthermore, after gradually adjusting the aperture size of the photographic device as a proper aperture size, the shutter speed and the ISO value may be adjusted adaptively based on meanings of the aperture size, the shutter speed and the ISO value as well as the correlation therebetween described above.

For example, after the gradual decrease of the aperture size, the photographic device may adjust the shutter speed preferably. Since it is determined by the pupil size that the ambient light in current surroundings becomes stronger, the shutter speed may be increased properly. Each time after completion of adjustments for the aperture size and the shutter speed, the ISO value may be adapted automatically as a proper value by the photographic device according to the aperture size and the shutter speed resulted by the adjustments.

In the present embodiment, the aperture size of the photographic device may be adjusted gradually according to the variation trend of the pupil size, which is indicative of the person's response to strength of ambient light in current surroundings. The shutter speed and the ISO value may be further adjusted adaptively. Thus, the photography parameters of the photographic device may be adjusted automatically, conveniently and efficiently, so as to be adapt to current photography surroundings and to take a photo with desirable quality.

In various embodiments described above, both the ISO value and the shutter speed are adjusted according to the pupil size of the person. That is, the ISO value and the shutter speed are adjusted adaptively after completion of adjustment for the aperture size according to the pupil size. Alternatively, a method according to an embodiment shown in FIG. 7 may also be performed subsequently to the completion of adjustment for the aperture size of the photographic device according to the various embodiments described above, so as to perform adjustment for the ISO value and the shutter speed.

Figure 7:
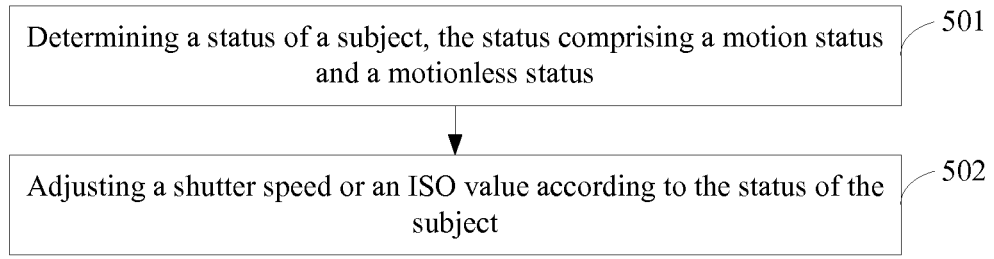
FIG. 7 is a flow chart illustrating a method for adjusting photography parameters according to an exemplary embodiment.

FIG. 7 is a flow chart illustrating a method for adjusting photography parameters according to an exemplary embodiment. As shown in FIG. 7, the method may include following steps.

In step 501, determining a status of a subject, the status comprising a motion status and a motionless status.

There are a variety of objects being photographed in a photo. The subject in the present embodiment refers to a main subject among those photographed objects, that is, a target object to be photographed by the person.

In order to determine whether the subject is in the motion or motionless status, there is a simple manner in which the photographic device may be notified via a button or an option interface input by the person based on a fact whether the subject is moving. However, such manner may be limited narrowly to be suitable for use in photographic devices such as cameras, mobile phones and the like, rather than those miniature wearable photographic devices for which complexity of hardware design is increased and inconvenient operation may be imposed on the person.

As another simple manner, the status of the subject may be determined based on an obtained subject image having the subject therein.

In order to achieve such a manner, a simple implementation example may be given as follows: taking an image of the subject; identifying the subject and a background from the image through image recognition technology; and determining the status of the subject according to a motion property of the subject per se and a characteristic of the background. For example, if the subject is a bird and the background is a wide blue picture, then the subject, i.e. the bird may be determined as in the motion status. For another example, if the subject is a building, then it may be determined as in the motionless status. As can be seen, there is also limitation on such manner.

Another implementation example of such a manner may include: obtaining at least two images of the subject in time order; and determining the status of the subject by analyzing a motion characteristic of the subject in the successive images of the subject.

Taking two images of the subject for an example, the status of the subject may be determined by calculating a displacement of an identical pixel of the subject between the two images of the subject.

In step 502, adjusting the shutter speed or the ISO value according to the status of the subject.

In adjustment of the shutter speed or the ISO value according to the status of the subject, a manner may be adopted as follows:

increasing the shutter speed if the subject is in the motion status; and decreasing the ISO value if the subject is in the motionless status.

As can be known from the meaning of the shutter speed and its effect on photography quality, the shutter speed is more important than the ISO value in photographing an object in the motion status. Thus in the present embodiment, for a subject in the motion status, the shutter speed is preferably adjusted to be faster, so as to freeze motion. Accordingly, the ISO value may be adjusted automatically and adaptively after completion of adjustments for the aperture size and the shutter speed.

In contrast, the ISO value may be more important than the shutter speed in photographing an object in the motionless status. Thus, for a subject in the motionless status, the ISO value may be preferably adjusted to be smaller, so as to decrease noises in the picture. Accordingly, the shutter speed may be adjusted automatically and adaptively after completion of adjustments for the aperture size and the ISO value.

In the embodiments, the shutter speed or the ISO value may be preferably adjusted depending on whether the subject is in the motion or motionless status after completion of adjustment for the aperture size of the photographic device according to the pupil size. Accordingly, the photography parameters of the photographic device not only can be adjusted automatically, quickly and efficiently, but also can be adjusted to be more adaptive with the current photography surroundings and the subject, so as to achieve a desirable quality of photograph.

Implementation process of the method for adjusting photography parameters of the photographic device are described as above, and can be performed by an adjustment apparatus, for which an internal functionality and structure will now be described hereinafter.

Figure 8:
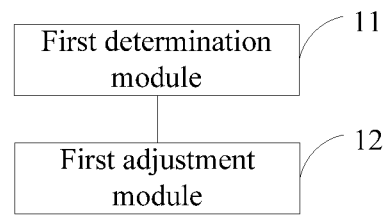
FIG. 8 is a block diagram illustrating an apparatus for adjusting photography parameters of a photographic device according to an exemplary embodiment.

FIG. 8 is a block diagram illustrating an apparatus for adjusting photography parameters of a photographic device according to an exemplary embodiment. As shown in FIG. 8, the adjustment apparatus may include a first determination module 11 and a first adjustment module 12.

The first determination module 11 is configured to determine a pupil size of a person.

The first adjustment module 12 is configured to adjust the photography parameters according to the pupil size.

Figure 9:
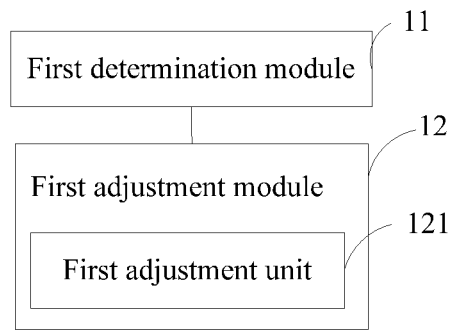
FIG. 9 is a block diagram illustrating an apparatus for adjusting photography parameters according to an exemplary embodiment.

As shown in FIG. 9, which is a block diagram illustrating embodiments of an apparatus for adjusting photography parameters according to an exemplary embodiment, the first adjustment module 12 may include a first adjustment unit 121 based on the embodiment shown in FIG. 8.

The first adjustment unit 121 is configured to adjust the aperture size according to the mapping relation preset between pupil sizes and aperture sizes.

Figure 10:
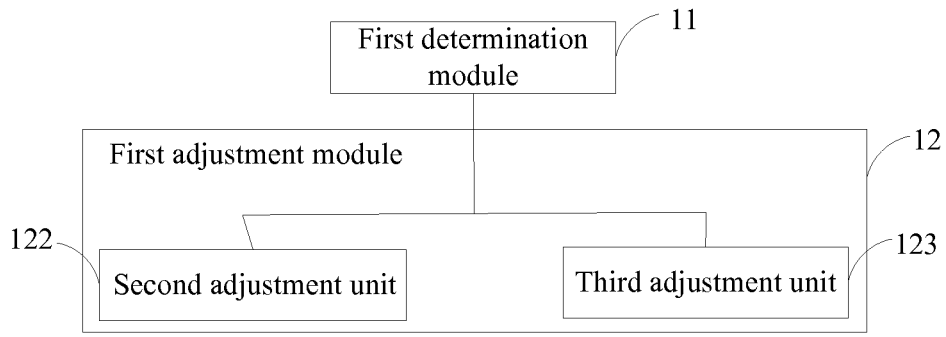
FIG. 10 is a block diagram illustrating an apparatus for adjusting photography parameters according to an exemplary embodiment.

FIG. 10 is a block diagram illustrating an apparatus for adjusting photography parameters according to an exemplary embodiment, the first adjustment module 12 may further include a second adjustment unit 122 and a third adjustment unit 123 based on the embodiment shown in FIG. 9.

The second adjustment unit 122 is configured to adjust the aperture size as being greater than a first preset aperture size if the pupil size is greater than or equal to a first standard reference value.

The third adjustment unit 123 is configured to adjust the aperture size as being smaller than a second preset aperture size if the pupil size is smaller than or equal to a second standard reference value.

Figure 11:
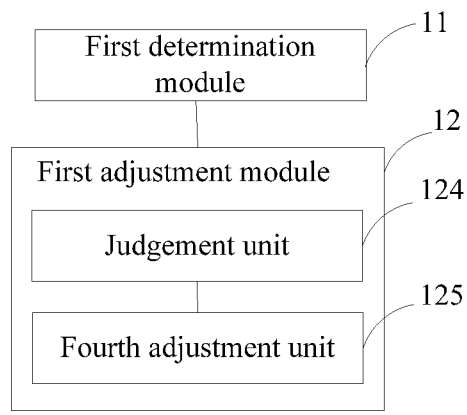
FIG. 11 is a block diagram illustrating an apparatus for adjusting photography parameters according to an exemplary embodiment.

In addition, as shown in FIG. 11, which is a block diagram illustrating a third embodiment of an apparatus for adjusting photography parameters according to an exemplary embodiment, the first adjustment module 12 may further include a judgment unit 124 and a fourth adjustment unit 125 based on the embodiments of the apparatus described above.

The judgment unit 124 is configured to determine a variation trend of the pupil size of the person between at least two successive time points.

The fourth adjustment unit 125 is configured to increase the aperture size gradually if the variation trend is upward.

Figure 12:
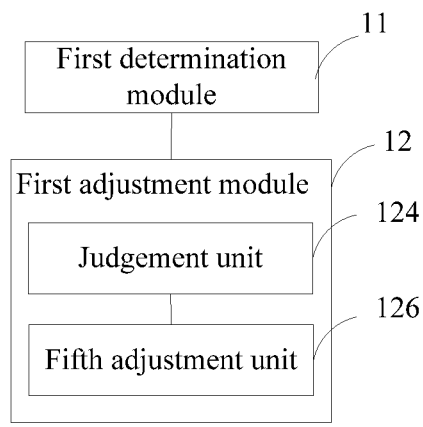
FIG. 12 is a block diagram illustrating an apparatus for adjusting photography parameters according to an exemplary embodiment.

As shown in FIG. 12, the first adjustment module 12 may further include a fifth adjustment unit 126.

The fifth adjustment unit 126 is configured to decrease the aperture size gradually if the variation trend is downward.

Figure 13:
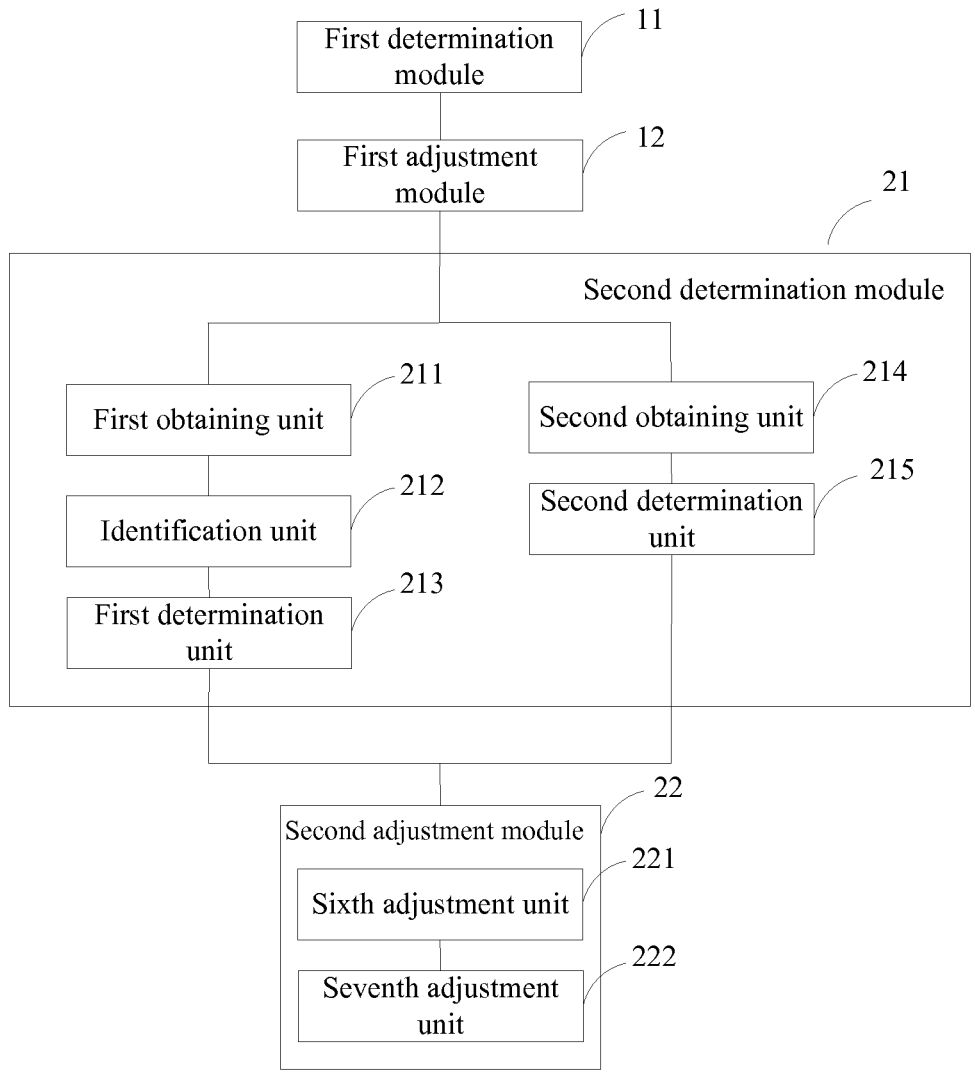
FIG. 13 is a block diagram illustrating an apparatus for adjusting photography parameters according to an exemplary embodiment.

Furthermore, FIG. 13 is a block diagram illustrating an apparatus for adjusting photography parameters according to an exemplary embodiment. As shown in FIG. 13, the adjustment apparatus may further include a second determination module 21 and a second adjustment module 22 based on the embodiments of the apparatus described above.

The second determination module 21 is configured to determine a status of a subject, the status including a motion status and a motionless status.

The second adjustment module 22 is configured to adjust a shutter speed or an ISO value according to the status of the subject.

In the embodiment, the second determination module 21 may include a first obtaining unit 211, an identification unit 212 and a first determination unit 213.

The first obtaining unit 211 is configured to obtain an image of the subject.

The identification unit 212 is configured to identify the subject and a background from the image of the subject.

The first determination unit 213 is configured to determine the status of the subject according to a motion property of the subject and a characteristic of the background.

Alternatively, the second determination module 21 may include a second obtaining unit 214 and a second determination unit 215.

The second obtaining unit 214 is configured to obtain at least two images of the subject in time order.

The second determination unit 215 is configured to determine the status of the subject according to a motion characteristic of the subject in the at least two images of the subject.

In the embodiment, the second adjustment module 22 may include a sixth adjustment unit 221 and a seventh adjustment unit 222.

The sixth adjustment unit 221 is configured to increase the shutter speed if the subject is in the motion status.

The seventh adjustment unit 222 is configured to decrease the ISO value if the subject is in the motionless status.

With respect to the apparatus in the above embodiments, the specific manners for performing operations for respective modules and units therein have been described in detail in the embodiments regarding the method, which will not be elaborated herein.

Figure 14:
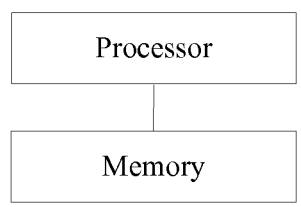
FIG. 14 is a block diagram illustrating an apparatus for adjusting photography parameters according to an exemplary embodiment.

The internal functionality and structure of the apparatus for adjusting photography parameters of the photographic device are described as above. As shown in FIG. 14, the apparatus for adjusting photography parameters may be implemented including:

a processor; and a memory for storing instructions executable by the processor, wherein the processor is configured to perform:

determining a pupil size of a person; and adjusting one or more photography parameters according to the pupil size.

In the embodiments of the present disclosure, the pupil size of the person is determined, and then one or more photography parameters such as the aperture size may be adjusted automatically according to the pupil size of the person. Since a current pupil size of the person is subject to a light intensity in current surroundings, the photography parameters of a photographic device may be adjusted automatically and efficiently based on the pupil size. Thus, the photography parameters are adapted to the current surroundings through simple operation for anyone without professional skills.

Figure 15:
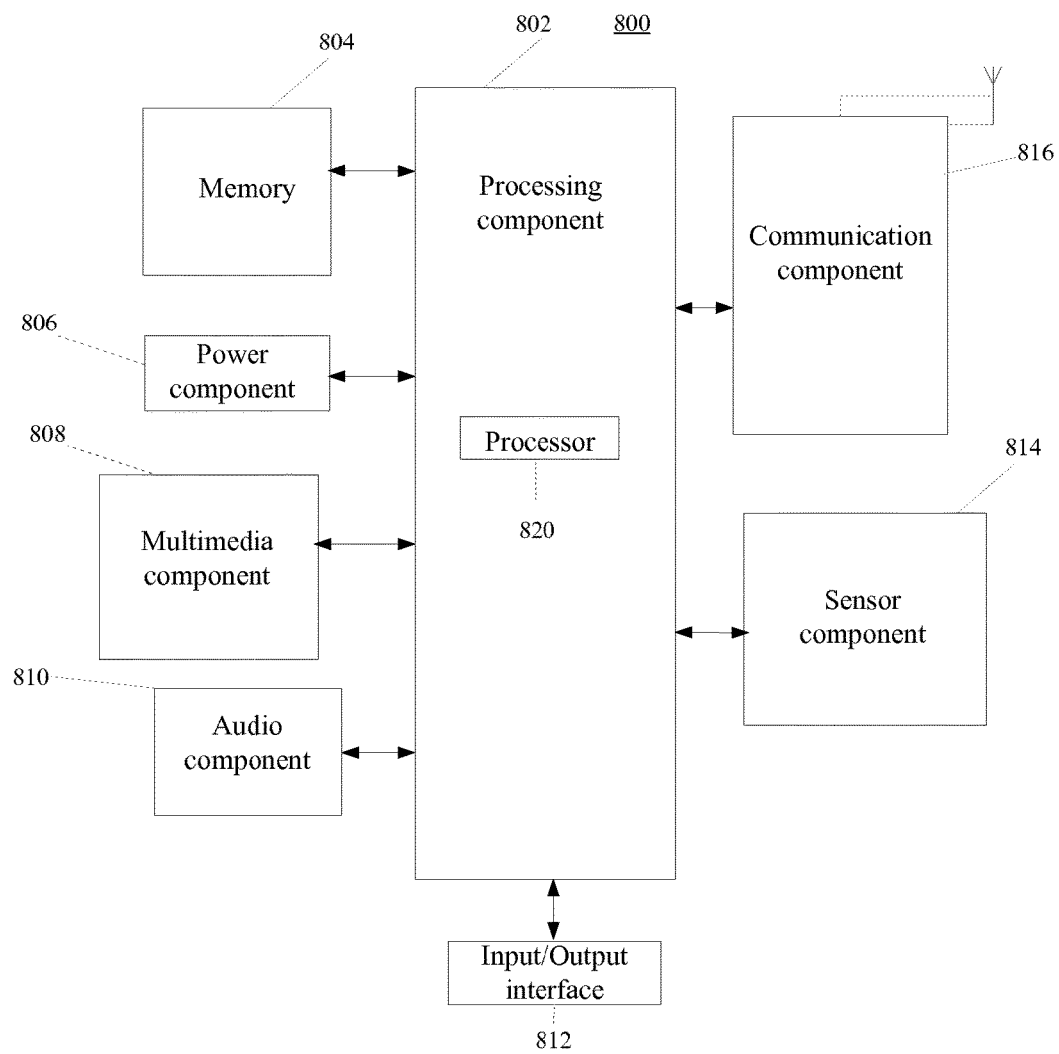
FIG. 15 is a block diagram illustrating an apparatus for adjusting photography parameters according to an exemplary embodiment.

FIG. 15 is a block diagram illustrating an apparatus used for adjusting photography parameters according to an exemplary embodiment. For example, the apparatus 800 may be anyone selected from a group consisting of a mobile phone, a computer, a digital broadcast terminal device, a messaging device, a gaming console, a tablet, a medical device, an exercise equipment, a personal digital assistant (PDA), and the like.

Referring to FIG. 15, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls overall operations of the apparatus 800, such as operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any application or method operated on the apparatus 800, contact data, phonebook data, messages, pictures, videos, etc. The memory 804 may be implemented using any type of volatile or non-volatile memory apparatus or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 806 provides power to various components of the apparatus 800. The power component 806 may include a power management system, one or more power sources, and other components associated with the generation, management, and distribution of power in the apparatus 800.

The multimedia component 808 includes a screen providing an output interface between the apparatus 800 and the user. In some embodiments, the screen may include a liquid crystal display (LCD) and a touch panel (TP). If the screen includes the touch panel, the screen may be implemented as a touch screen to receive input signal from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 808 includes a front camera and/or a rear camera. The front camera and/or the rear camera may receive an external multimedia datum while the apparatus 800 is in an operation mode, such as a photographing mode or a video mode. Each of the front camera and the rear camera may be a fixed optical lens system or have focus and optical zoom capability.

The audio component 810 is configured to output and/or input audio signal. For example, the audio component 810 includes a microphone (MIC) configured to receive external audio signal when the apparatus 800 is in an operation mode, such as a call mode, a recording mode, and a voice identification mode. The received audio signal may be further stored in the memory 804 or transmitted via the communication component 816. In some embodiments, the audio component 810 further includes a speaker to output audio signal.

The I/O interface 812 provides an interface between the processing component 802 and peripheral interface modules, such as a keyboard, a click wheel, a button, or the like. The button may include, but not limited to, a home button, a volume button, a starting button, or a locking button.

The sensor component 814 includes one or more sensors to provide status assessments of various aspects of the apparatus 800. For instance, the sensor component 814 may detect an open/closed status of the apparatus 800, relative positioning of components, e.g., the display and the keyboard, of the apparatus 800, a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 800 and other apparatuses. The apparatus 800 may access a wireless network based on a communication standard, such as WIFI, 2G, or 3G, or a combination thereof. In one exemplary embodiment, the communication component 816 receives broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 800 may be implemented with one or more application specific integrated circuits (ASICs), digital signal processors (DSPs), digital signal processing apparatuses (DSPDs), programmable logic apparatuses (PLDs), field programmable gate arrays (FPGAs), controllers, micro-controllers, microprocessors, or other electronic components, for performing the above method.

In exemplary embodiments, there is also provided a non-transitory computer readable storage medium including instructions, such as instructions included in the memory 804, executable by the processor 820 in the apparatus 800, for performing the above method. For example, the non-transitory computer-readable storage medium may be a ROM, a random access memory (RAM), a CD-ROM, a magnetic tape, a floppy disc, an optical data storage apparatus, or the like.

A non-transitory computer-readable storage medium includes instructions, executable by a processor of a mobile terminal, to enable the mobile terminal to perform a method for accessing network. The method includes:

determining a pupil size of a person; and adjusting one or more photography parameters according to the pupil size.

Herein, the photography parameters include an aperture size, a shutter speed, and an ISO value.

Alternatively, the adjusting one or more photography parameters according to the pupil size includes:

adjusting the aperture size according to a mapping relation preset between pupil sizes and aperture sizes.

Herein, the adjusting the aperture size according to a mapping relation preset between pupil sizes and aperture sizes includes:

adjusting the aperture size as being greater than a first preset aperture size if the pupil size is greater than or equal to a first standard reference value;

or, adjusting the aperture size as being smaller than a second preset aperture size if the pupil size is smaller than or equal to a second standard reference value, wherein the first standard reference value is greater than the second standard reference value.

The adjusting one or more photography parameters according to the pupil size may also include:

determining a variation trend of the pupil size of the person between at least two successive time points; and increasing the aperture size gradually if the variation trend is upward, or, decreasing the aperture size gradually if the variation trend is downward.

The method may further include:

determining a status of a subject, the status including a motion status and a motionless status; and adjusting the shutter speed or the ISO value according to the status of the subject.

Herein, the determining a status of a subject includes:

obtaining an image of the subject;

identifying the subject and a background from the image of the subject; and determining the status of the subject according to a motion property of the subject and a characteristic of the background, or, obtaining at least two images of the subject in time order; and determining the status of the subject according to a motion characteristic of the subject in the at least two images of the subject.

Herein, the adjusting the shutter speed or the ISO value according to the status of the subject includes:

increasing the shutter speed if the subject is in the motion status;

or, decreasing the ISO value if the subject is in the motionless status.

Other embodiments of the invention will be apparent to those skilled in the art from consideration of the specification and practice of the invention disclosed herein. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for adjusting photography parameters, comprising:

determining, by a photographic device, a pupil size of a person;

determining, by the photographic device, a variation trend of the pupil size of the person between at least two successive time points; and adjusting, by the photographic device, one or more photography parameters according to the pupil size and the variation trend;

wherein the one or more photography parameters comprise at least one of the following: an aperture size, a shutter speed, and an ISO value; and wherein adjusting the one or more photography parameters according to the pupil size comprises:

increasing the aperture size gradually when the variation trend is upward; and decreasing the aperture size gradually when the variation trend is downward.

2. The method according to claim 1, wherein adjusting the one or more photography parameters according to the pupil size comprises:

adjusting the aperture size according to a mapping relation preset between pupil sizes and aperture sizes.

3. The method according to claim 2, wherein adjusting the aperture size according to a mapping relation preset between pupil sizes and aperture sizes comprises:

adjusting the aperture size as being greater than a first preset aperture size if the pupil size is greater than or equal to a first standard reference value;

or, adjusting the aperture size as being smaller than a second preset aperture size if the pupil size is smaller than or equal to a second standard reference value;

wherein the first standard reference value is greater than the second standard reference value.

4. The method according to claim 1, further comprising:

determining a status of a subject, the status comprising a motion status and a motionless status; and adjusting the shutter speed or the ISO value according to the status of the subject.

5. The method according to claim 4, wherein determining a status of a subject comprises:

obtaining an image of the subject;

identifying the subject and a background from the image of the subject through image recognition; and determining the status of the subject according to a motion property of the subject and a characteristic of the background, wherein the characteristic of the background comprises color of the background.

6. The method according to claim 4, wherein determining a status of a subject comprises:
obtaining at least two images of the subject in time order; and
determining the status of the subject according to a motion characteristic of the subject in the at least two images of the subject.

7. The method according to claim 4, wherein adjusting the shutter speed or the ISO value according to the status of the subject comprises:
increasing the shutter speed when the subject is in the motion status; and
decreasing the ISO value when the subject is in the motionless status.

8. An apparatus for adjusting photography parameters, comprising:
a processor; and
a memory for storing instructions executable by the processor;
wherein the processor is configured to perform:
determining a pupil size of a person;
determining a variation trend of the pupil size of the person between at least two successive time points; and
adjusting one or more photography parameters according to the pupil size and the variation trend;
wherein the one or more photography parameters comprise at least one of the following: an aperture size, a shutter speed, and an ISO value; and
wherein the processor is configured to adjust the photography parameters according to the pupil size by performing acts comprising:
increasing the aperture size gradually when the variation trend is upward; and
decreasing the aperture size gradually when the variation trend is downward.

9. The apparatus according to claim 8, wherein the processor is configured to perform:
adjusting the aperture size according to a mapping relation preset between pupil sizes and aperture sizes.

10. The apparatus according to claim 9, wherein the processor is configured to adjust the aperture size according to a mapping relation preset between pupil sizes and aperture sizes by performing acts comprising:
adjusting the aperture size as being greater than a first preset aperture size if the pupil size is greater than or equal to a first standard reference value;
or,
adjusting the aperture size as being smaller than a second preset aperture size if the pupil size is smaller than or equal to a second standard reference value;
wherein the first standard reference value is greater than the second standard reference value.

11. The apparatus according to claim 8, wherein the processor is further configured to perform:
determining a status of a subject, the status comprising a motion status and a motionless status; and
adjusting the shutter speed or the ISO value according to the status of the subject.

12. The apparatus according to claim 11, wherein the processor is configured to determine a status of a subject by performing acts comprising:
obtaining an image of the subject;
identifying the subject and a background from the image of the subject; and
determining the status of the subject according to a motion property of the subject and a characteristic of the background.

13. The apparatus according to claim 11, wherein the processor is configured to determine a status of a subject by performing acts comprising:
obtaining at least two images of the subject in time order; and
determining the status of the subject according to a motion characteristic of the subject in the at least two images of the subject.

14. The apparatus according to claim 11, wherein the processor is configured to adjust the shutter speed or the ISO value according to the status of the subject by performing acts comprising:
increasing the shutter speed when the subject is in the motion status; and
decreasing the ISO value when the subject is in the motionless status.

15. A non-transitory computer-readable storage medium having stored therein instructions that, when executed by a photographic device, causes the photographic device to perform acts comprising:
determining a pupil size of a person;
determining a variation trend of the pupil size of the person between at least two successive time points; and
adjusting one or more photography parameters according to the pupil size and the variation trend;
wherein the one or more photography parameters comprise at least one of the following: an aperture size, a shutter speed, and an ISO value; and
wherein adjusting the one or more photography parameters according to the pupil size comprises:
increasing the aperture size gradually when the variation trend is upward; and
decreasing the aperture size gradually when the variation trend is downward.

* * * * *